UNITED STATES PATENT OFFICE.

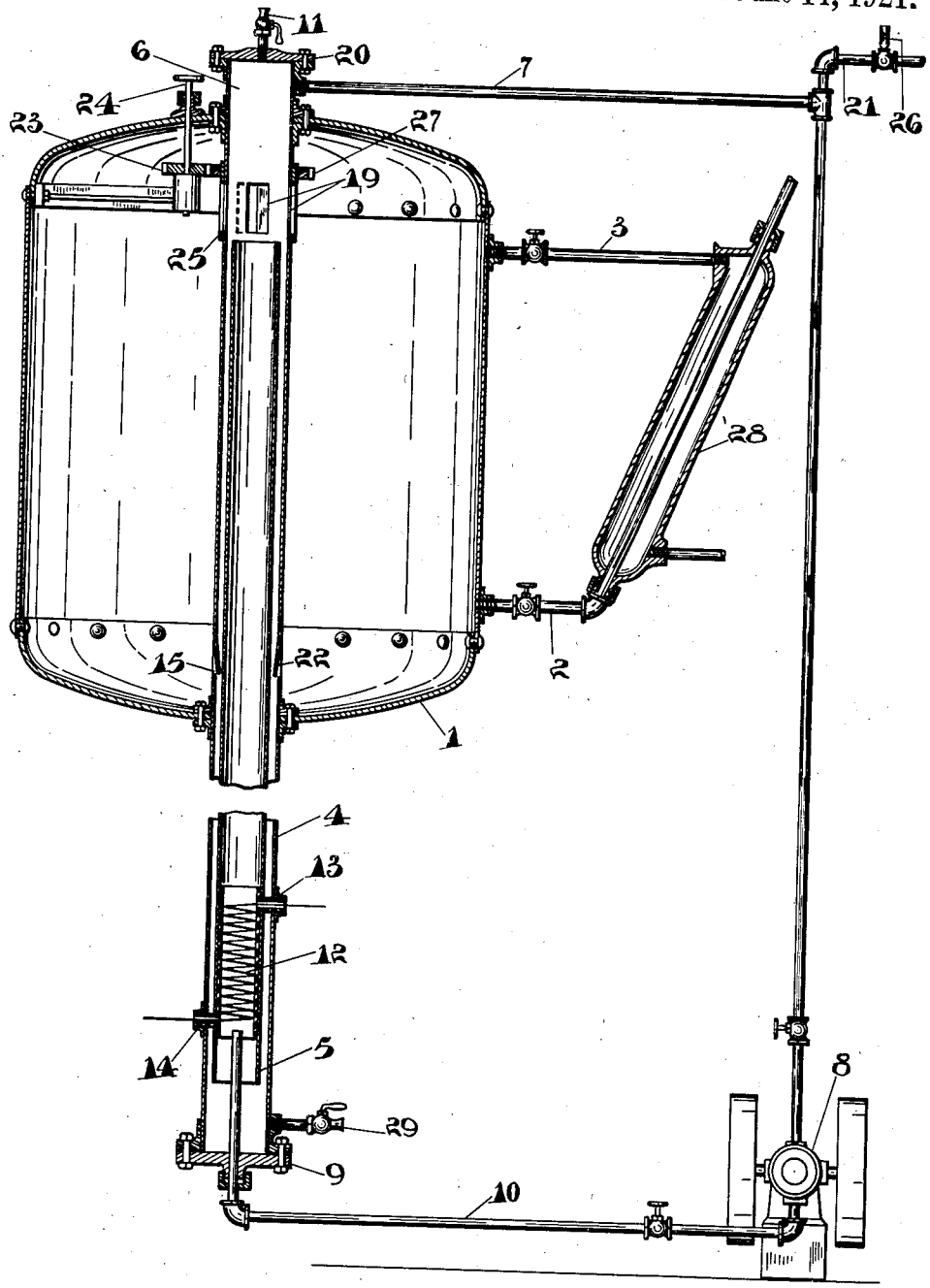

ARCHIBALD J. MacDOUGALL, OF TORONTO, ONTARIO, CANADA, ASSIGNOR TO NATIONAL ELECTRO PRODUCTS, LIMITED, OF TORONTO, CANADA.

PROCESS AND APPARATUS FOR HYDROGENATING OILS.

1,381,319.   Specification of Letters Patent.   Patented June 14, 1921.

Application filed May 22, 1919. Serial No. 299,034.

*To all whom it may concern:*

Be it known that I, ARCHIBALD J. MACDOUGALL, of the city of Toronto, in the county of York, Province of Ontario, Canada, have invented certain new and useful Improvements in Processes and Apparatus for Hydrogenating Oils, of which the following is a specification.

This invention relates to a process of solidifying oil by bringing it into intimate contact with pure hydrogen in the presence of a catalyst, and my object is to devise a process in which the oil and hydrogen are very intimately mixed and the necessary heat for starting the re-action preferably directly applied to the mingled oil and hydrogen.

I attain my object by utilizing the levitational effect of the hydrogen in suitable apparatus to circulate the oil and catalyst through narrow channels over highly heated surfaces, separating the oil mixture and hydrogen at the top of such surfaces, returning the oil mixture to the bottom of the apparatus, and pumping the separated hydrogen back to the bottom of the apparatus to again exert its levitational effect on the mixture.

The process is carried out in apparatus constructed substantially as hereinafter described and illustrated in the accompanying drawing, which is a vertical section of the apparatus.

1 is a tank provided, preferably near its lower end, with a valve controlled oil and catalyst inlet pipe 2 and near its upper end with a valve controlled outlet pipe 3. Extending through the tank and well below the bottom thereof is a tube 4, within which is supported, preferably concentric therewith the tube 5. An annular channel is thus formed surrounding a tubular channel. The tube 5 is shorter than the tube 4 so that a separating chamber 6 is formed at the upper end of the tube 4, while free ingress to the lower end of the tube 5 is provided at the bottom. A suitable cap 20 closes the upper end of the separating chamber, which cap is preferably provided with a gas cock 21.

The tube 4 is provided with a plurality of openings 15 to provide communication between the channels formed by the tubes and the interior of the tank, and these openings are provided with lips 22 so that fluid flowing in the tube produces a suction effect through the holes. Fresh oil and catalyst cannot, of course, be taken in through the openings 15 unless the mixture is allowed to leave the circulating system at some other point. I therefore form in the tube 4 close to the top of the tank 1 a series of openings 19 adapted to be controlled by a rotatable ring 25 provided with slots corresponding to the openings 19 and controlling the same in the manner of a slide damper.

To rotate this ring I provide the spindle 24 suitably journaled on the tank and extending out through the same, which spindle carries a gear wheel 23 meshing with the gear wheel 27 on the rotary ring 25.

From the upper part of the separating chamber 6 extends the hydrogen pipe 7. This pipe is led to the compressing pump 8. From the compressing pump leads the hydrogen inlet pipe 10 of the apparatus, which passes through the cap 9 closing the lower end of the tube 4 into the lower end of the pipe 5 and extending above the lower end thereof Bubbles of hydrogen are thus readily introduced into the tube 5 and will raise the oil and catalyst up through the tube on the same principle as the well known air-lift pumping apparatus A constant and rapid flow of oil and catalyst and hydrogen in intimate admixture is thus maintained up the channel formed by the tubes. At the top, the excess hydrogen separates out and returns to the pump through the pipe 7 to be again forced to the apparatus through the pipe 10.

The necessary temperature of re-action is obtained preferably by directly heating one of the walls of the channels through which the mixture of oil, catalyst and hydrogen is passed. In the arrangement shown, electrically generated heat is applied to the inner surface of the annular channel up which the mixture passes. This may be effected by supporting against the wall an electrical resistance element 12 suitably insulated from the wall.

The electrical connections to the heating element are led in through suitably insulated bushings 13 and 14.

When the apparatus is in operation small quantities of the oil and catalyst circulating in the circulating system are allowed to escape more or less continuously. Corresponding quantities then pass in through the openings 15. The rate of escape may be regulated so that a hydrogenated oil of the desired purity escapes into and gradually fills the upper part of the tank, the raw oil passing away from the bottom of the tank as the hydrogenated oil accumulates. At the close of a certain period the tank is completely filled with hydrogenated oil.

As an alternative, hydrogenated oil may be withdrawn more or less continuously and fresh oil and catalyst continuously introduced, and this may be done in such a manner that there is heat exchanged between the hot upflowing oil and the cool inflowing oil. In the drawing I show the inlet pipe 2 as passing through a chamber 28 formed in the oil outlet pipe 3. With this apparatus, it is quite easy to insure such a difference in temperature between the raw oil and the hydrogenated oil that the latter will always overlie the raw oil in the tank, so that it is readily withdrawn in substantial purity as hereinbefore described, and partly at least separated from catalyst. This separation is due to the fact that the difference in specific gravity of the oil and catalyst is very great and the latter will in great part settle if the hydrogenated oil is slowly withdrawn at a point distant from the openings 19.

Hydrogen to supply the place of that which is combined with the oil during the re-action may be supplied through the pipe 21 provided with the regulating valve 26. A blow-off cock 28 is provided at the bottom of the pipe 4.

In starting operations, it will be understood that the tank is filled with the raw oil, and a catalyst, which catalyst will usually be metallic nickel prepared in a finely divided state by chemical precipitation and reduction of the oxid as is well known in the art. The method of its preparation is set forth, for example, in "The production and treatment of vegetable oils" by T. W. Chalmers, published 1918. Hydrogen is then pumped in through the inlet pipe 10 until a pressure of approximately eighty pounds to the square inch is attained. At the same time, an electrical current is passed through the element 12 until the temperature of the oil and catalyst is raised to between 200 degrees and 250 degrees centigrade, at which temperature it is maintained until hydrogenation is completed. As the reaction is exothermic, the heating must be carefully regulated not to exceed a suitable upper limit. The injected hydrogen maintains the circulation as hereinbefore described, and as the hydrogen, oil and catalyst are all directly in contact with the surfaces from which the heat is derived, the re-action is very rapidly and efficiently conducted.

What I claim as my invention is:—

1. A process of hydrogenating oils which consists in circulating the oil mixed with a catalyst in upwardly and downwardly extending channels forming a circulating system, by introducing hydrogen into the lower part of the upflow side of the circulatory system, maintaining a suitable temperature and pressure during the reaction, regularly and automatically withdrawing small quantities of hydrogenated oil from the circulating system into the upper part of a storage reservoir, and simultaneously introducing similar quantities of raw oil and catalyst into the circulating system from the same reservoir.

2. Apparatus for hydrogenating oils comprising a tank; a circulating system communicating with the tank at different levels and comprising an upflow channel and a downflow channel communicating at each end and having a separating chamber at their upper ends; means for introducing hydrogen into the upflow channel adjacent its lower end and for withdrawing it from the separating chamber; and means for heating the oil.

3. Apparatus for hydrogenating oils constructed as set forth in claim 2 in which the heating means comprises electrical resistance placed to supply heat to the oil and catalyst at some point in the circulatory system.

4. Apparatus for hydrogenating oils constructed as set forth in claim 2 in which the channels are formed of two tubes of different diameters placed one within the other to form an annular channel and a tubular channel.

5. A process of hydrogenating oils which consists in rapidly circulating the oil mixed with hydrogen and a catalyst in a circulating system of relatively small capacity, maintaining a suitable temperature and pressure during the re-action, regularly and automatically withdrawing small quantities of hydrogenated oil from the circulating system into the upper part of a storage reservoir of relatively large capacity and simultaneously introducing similar quantities of raw oil and catalyst into the circulating system from the same reservoir in which the catalyst tends to separate by gravity from the hydrogenated oil.

6. A process of hydrogenating oils as set forth in claim 5 in which hydrogenated oil is drawn off from the tank and is caused to give up heat to raw oil and catalyst fed to the tank to take the place of the hydrogenated oil drawn off.

Signed at Toronto this 23rd day of April A. D. 1919.

ARCHIBALD J. MacDOUGALL.